(12) United States Patent  
Kuo et al.

(10) Patent No.: US 7,845,838 B2
(45) Date of Patent: Dec. 7, 2010

(54) LIGHT EMITTING DIODE LAMP (75) Inventors: Jer-Haur Kuo, Taipei Hsien (TW); Shun-Yuan Jan, Taipei Hsien (TW); Fang-Xiang Yu, Shenzhen (CN); Xin-Xiang Zha, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 158 days.

(21) Appl. No.: 12/202,400

(22) Filed: Sep. 1, 2008

(65) Prior Publication Data
US 2009/0284968 A1 Nov. 19, 2009

(30) Foreign Application Priority Data
May 14, 2008 (CN) .......................... 2008 1 0067166

(51) Int. Cl.
*G02B 26/00* (2006.01)
(52) U.S. Cl. .................... 362/552; 362/551; 362/217.02
(58) Field of Classification Search ................ 362/551, 362/552, 555, 217.01, 217.02, 217.04, 330
See application file for complete search history.

(56) References Cited

U.S. PATENT DOCUMENTS

| 4,422,719 A | * | 12/1983 | Orcutt | 385/123 |
| 5,363,470 A | * | 11/1994 | Wortman | 385/147 |
| 6,997,584 B1 | * | 2/2006 | Rothan et al. | 362/473 |
| 2009/0295311 A1 | * | 12/2009 | Duerr et al. | 315/313 |

FOREIGN PATENT DOCUMENTS

| CN | 1388495 A | 1/2003 |
| CN | 2898590 Y | 5/2007 |
| CN | 200958727 Y | 10/2007 |

* cited by examiner

*Primary Examiner*—Ali Alavi
(74) *Attorney, Agent, or Firm*—Frank R. Niranjan (57) ABSTRACT A light emitting diode (LED) lamp includes a lampshade, a light guide pole and a plurality of LEDs. The light guide pole is of light permeable material and received in the lampshade. A plurality of irregular elements is formed on an outer surface of the light guide pole. A distribution density of the irregular elements decreases gradually from two ends of the light guide pole towards a middle of the light guide pole. The LEDs are mounted at the two ends of the light guide pole. Light emitted by the light emitting diodes falls incident into the light guide pole and exits the light guide pole from the outer surface thereof.

14 Claims, 8 Drawing Sheets

LIGHT EMITTING DIODE LAMP

BACKGROUND

1. Field of the Invention

The present invention relates to light emitting diode lamps, and particularly to a light emitting diode lamp for indoor illumination.

2. Description of Related Art

At present, light emitting diodes (LED) are widely used due to high brightness, wide color range and rapid response speed. With the rapid development in both commercial and residential illumination, the demand for LEDs in indoor illumination devices has increased.

Generally, residential users prefer a soft lighting environment for comfortable conditions. Even so, it is necessary for indoor illumination devices to provide sufficient brightness of a proper intensity and uniformity. Thus, there is a need for an LED lamp providing light of an acceptable intensity and uniformity.

SUMMARY

The present invention provides a light emitting diode lamp. An exemplary light emitting diode lamp includes a lampshade, a light guide pole and a plurality of light emitting diodes. The light guide pole is of light permeable material and received in the lampshade. The light guide pole has an elongate profile. Two opposite ends of the light guide pole are mounted on two ends of the lampshade, respectively. A plurality of roughened elements are formed on an outer surface of the light guide pole. A distribution density of the irregular elements is decreased from the two ends of the light guide pole towards the middle of the light guide pole. The light emitting diodes are mounted at the two ends of the light guide pole. Light emitted by the light emitting diodes falls incident into the light guide pole and exits the light guide pole through the outer surface thereof.

Other advantages and novel features of the present invention will become more apparent from the following detailed description of preferred embodiments when taken in conjunction with the accompanying drawings.

DETAILED DESCRIPTION

Reference will now be made to the drawing figures to describe the exemplary embodiments in detail.

Figure 1:
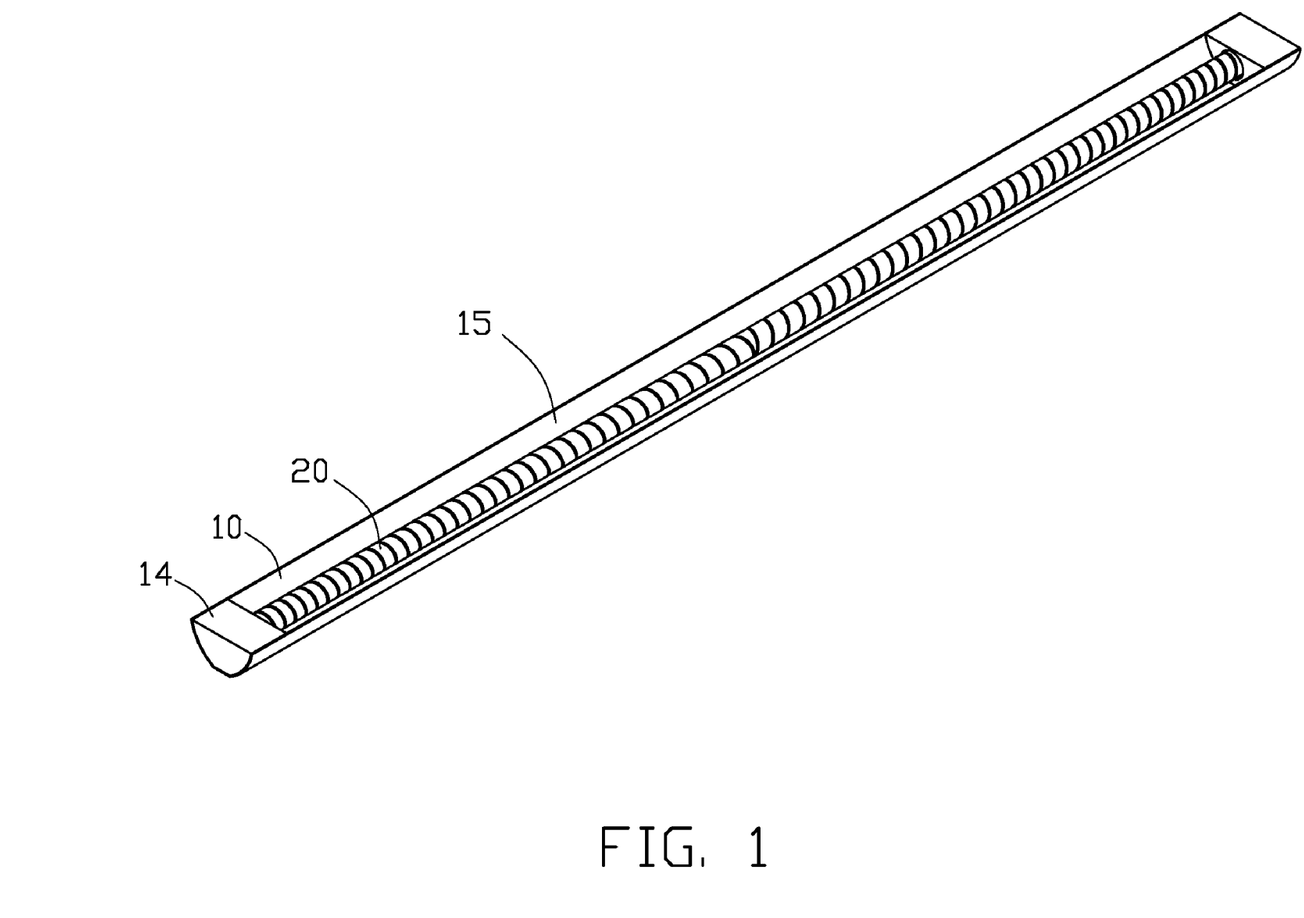
FIG. 1 is an assembled, isometric view of a light emitting diode lamp according to a first exemplary embodiment of the present invention.
Figure 2:
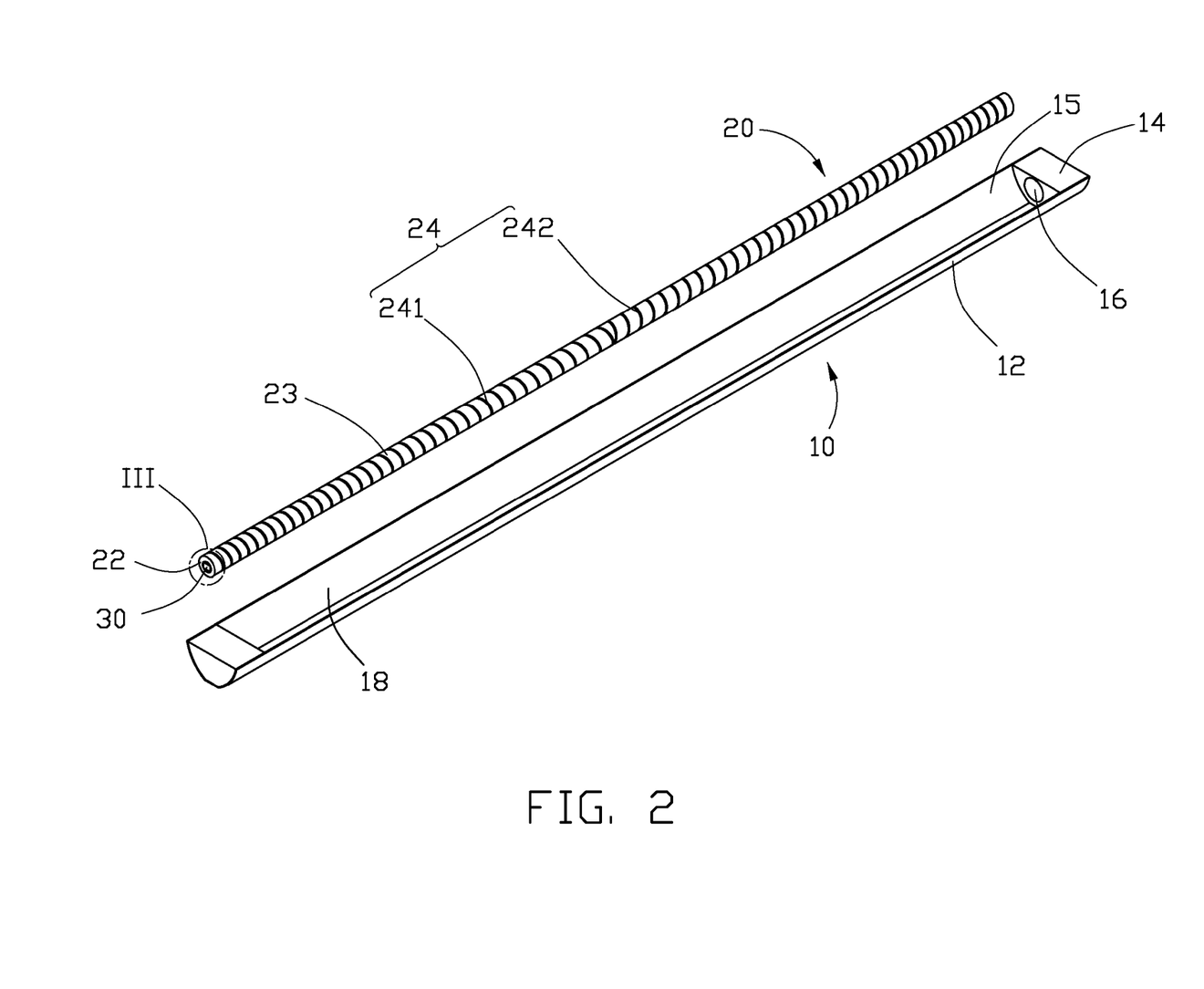
FIG. 2 is an exploded view of the light emitting diode lamp of FIG. 1.
Figure 3:
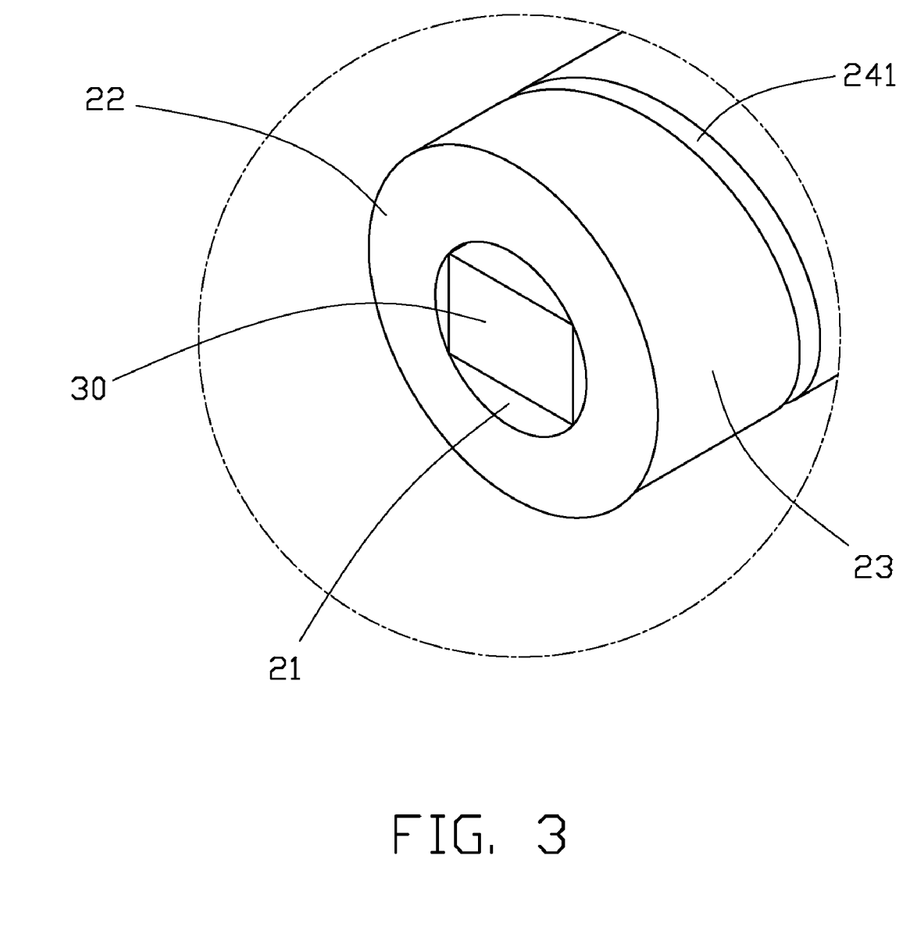
FIG. 3 is an enlarged view of a circled portion III of FIG. 2.

Referring to FIGS. 1 to 3, a light emitting diode (LED) lamp includes a lampshade 10, a light guide pole 20 and two LEDs 30 (only one LED is visible).

The light guide pole 20 is of a light permeable material, such as polymethylmethacrylate (PMMA), poly carbonate (PC), silicone, polyacrylate, epoxy, or glass. The light guide pole 20 includes an elongated, columned main body 23, two receiving holes 21 (only one receiving hole is shown) defined in two opposite end surfaces 22 of the main body 23 and a plurality of irregular elements formed on an outer surface of the main body 23. In this embodiment, the irregular elements are grooves 24 defined in the outer surface. Each of the end surfaces 22 of the main body 23 is an annular, planar surface with the corresponding receiving hole 21 defined in a center portion thereof. The grooves 24 include a first spiral groove 241 extending clockwise from one end of the main body 23 to a middle of the main body 23 and a second spiral groove 242 extending counterclockwise from the other end of the main body 23 to the middle of the main body 23. A pitch of each of the first spiral groove 241 and the second spiral groove 242 increases gradually from the corresponding end of the main body 23 towards the middle of the main body 23.

Referring to FIG. 3, each of the LEDs 30 is rectangular in profile. A diameter of each of the receiving holes 21 along a radial direction of the main body 23 is substantially equal to a diagonal length of the LED 30, and a depth of each of the receiving holes 21 along an axial direction of the main body 23 equals a height of the LED 30. The LEDs 30 are received in the receiving holes 21 of the two ends of the main body 23, respectively, wherein a light exiting surface of each of the LEDs 30 faces the middle of the main body 23. Alternatively, the LEDs 30 can be more than two according to light intensity requirements. For example, multiple LEDs 30 may be arranged densely and fitted into one of the receiving holes 21 as long as the receiving hole 21 has a sufficient size to accommodate the LEDs 30.

The lampshade 10 is of a material having high reflectivity. In this embodiment, the lampshade 10 is metal such as aluminum. The lampshade 10 includes a semi-cylindrical shell 12, two end caps 14 sealing two ends of the shell 12, and two central holes 16 (only one visible in FIG. 2) defined in the two end caps 14, respectively. The shell 12 has a U-shaped cross section. The shell 12 defines an opening 15 in a top side thereof. The shell 12 and the end caps 14 cooperatively form a space 18 in the lampshade 10 receiving the light guide pole 20 therein. The space 18 communicates with an external environment of the lampshade 10 via the opening 15. The central holes 16 of the end caps 14 face each other. The diameters of the central holes 16 equal the diameters of the two ends of the main body 23 of the light guide pole 20, respectively. Thus, the two ends of the main body 23 of the light guide pole 20 are fittingly received in the central holes 16 of the end caps 14 to connect the light guide pole 20 and the lampshade 10. Alternatively, the lampshade 10 can be of non-reflective material, but with a reflecting layer applied on an interior surface thereof. The reflecting layer can be of a reflective material, such as white printing ink.

During operation, light emitted by the LEDs 30 falls incident on an interior of the light guide pole 20 from the two ends of the main body 23, and is guided to disperse of the light guide pole 20 from the outer surface of the main body 23. A portion of the light from the outer surface of the main body 23 of the light guide pole 20 is directly emitted towards the opening 15 of the lampshade 10, and exits the LED lamp from the opening 15. The other portion of the light from the outer surface of the main body of the light guide pole 20 is first emitted towards the interior surface of the shell 12, then reflected by the shell 12 towards the opening 15 of the shell 12, and finally exits the LED lamp from the opening 15.

Since the LEDs 30 are located at the two ends of the main body 23 of the light guide pole 20, light is easily concentrated at the two ends of the light guide pole 20, such that light intensity there exceeds that at the middle of the light guide pole 20. Since the pitch of each of the first spiral groove 241 and the second spiral groove 242 gradually increases from the two ends of the light guide pole 20 towards the middle of the light guide pole 20, light reflected by the spiral grooves 241 and 242 gradually decreases from the two ends of the light guide pole 20 towards the middle of the light guide pole 20. Accordingly, more light is reflected by the first spiral groove 241 and the second spiral groove 242 at the two ends of the light guide pole 20 than at the middle of the light guide pole 20. The light incident towards the light guide pole 20 is thus uniformly distributed over the outer surface of the light guide pole 20.

Moreover, each of the first spiral groove 241 and the second spiral groove 242 extends helically around the outer surface of the light guide pole 20, such that the light incident on each pitch thread of the first spiral groove 241 and the second spiral groove 242 is of a different incident angle, thereby exiting the outer surface of the main body 23 of the light guide pole 20 in different directions to improve uniformity thereof. Furthermore, extending directions of the first spiral groove 241 and the second spiral groove 242 are opposite, with two ends of the main body 23 of the light guide pole 20 symmetric to the middle of the main body 23 of the light guide pole 20, thereby maximizing the uniformity of the light over the outer surface of the light guide pole 20.

Figure 4:
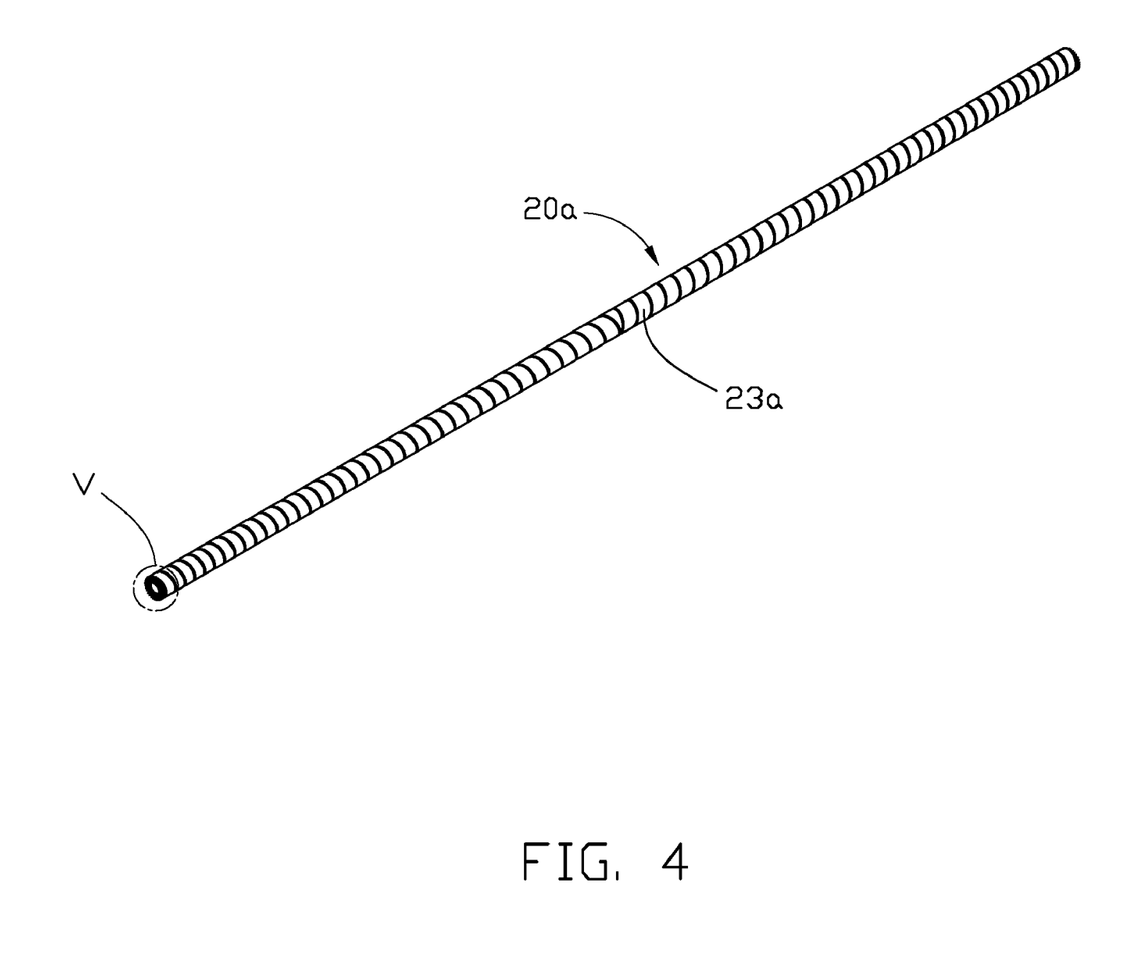
FIG. 4 is an isometric view of a light guide pole according to a second embodiment of the present invention.
Figure 5:
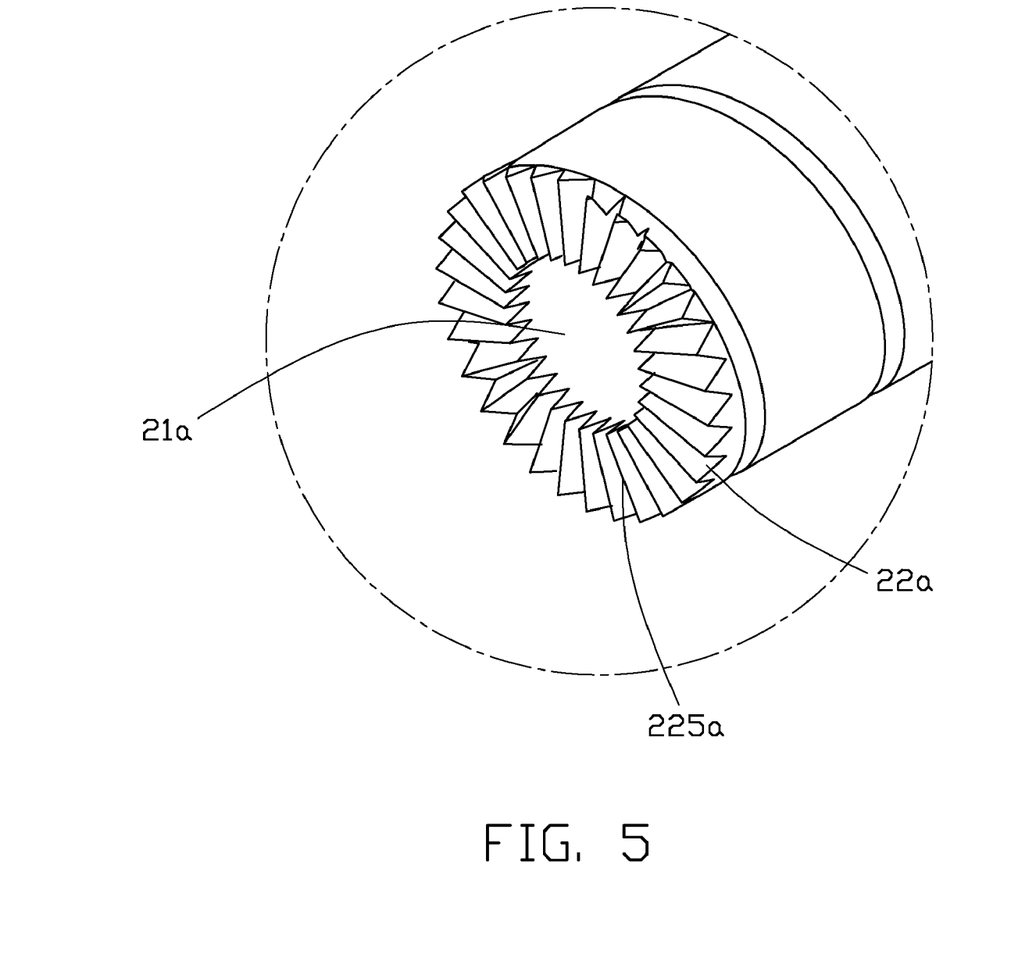
FIG. 5 is an enlarged view of a circled portion V of FIG. 4.

FIGS. 4 and 5 show a light guide pole 20a according to a second embodiment, differing from the previous embodiment only in the presence of a plurality of protrusions 225a formed on each of the end surfaces 22a of the main body 23a of the light guide pole 20a. The protrusions 225a extend radially outwardly from and surround the central hole 21a. Each of the protrusions 225a extends from an inner periphery of the end surface 22a to an outer periphery of the end surface 22a. Each of the protrusions 225a protrudes upwardly from the end surface 22a and converges as the protrusion 225a protrudes. Thus, each protrusion 225a has a gradually decreased width and a cross-section of each protrusion 225a is triangular.

Figure 6:
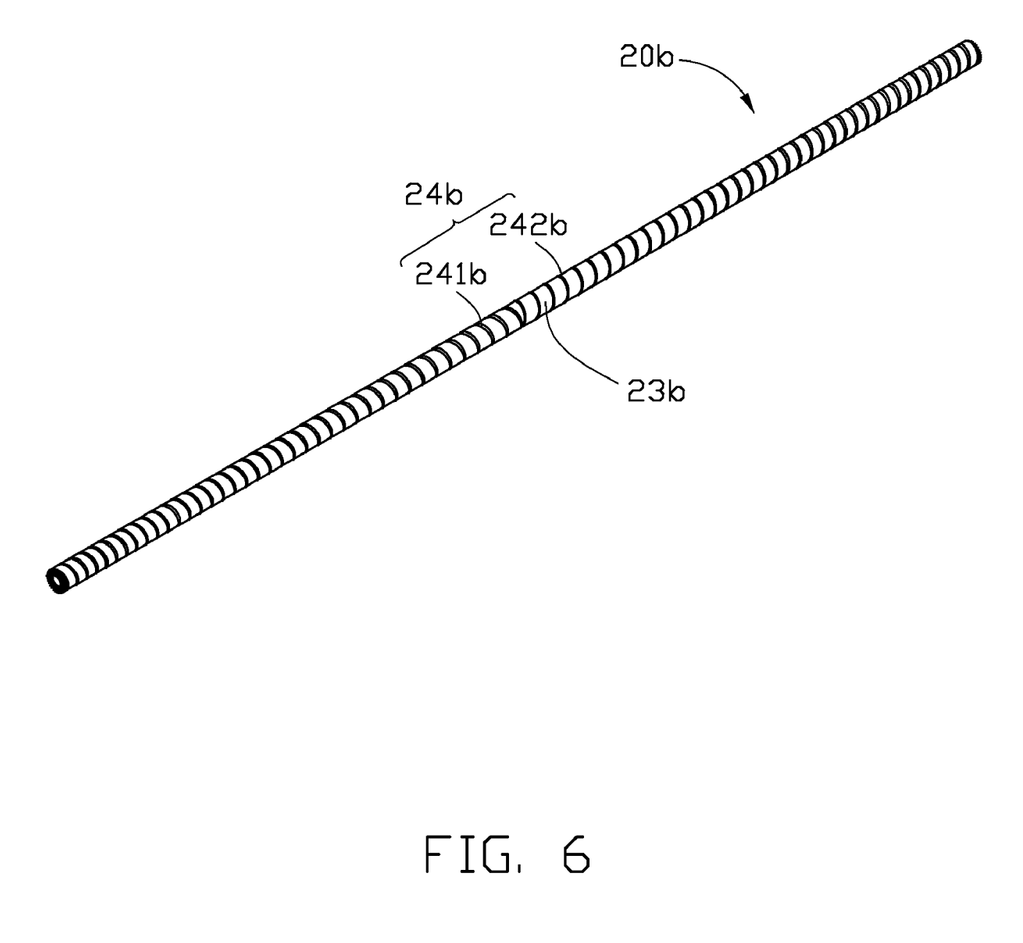
FIG. 6 is an isometric view of a light guide pole according to a third embodiment of the present invention.

FIG. 6 shows a light guide pole 20b according to a third embodiment, differing from the previous embodiment only in the presence of a plurality of ribs 24b, rather than grooves 24, protruding outwardly from the outer surface of the main body 23b of the light guide pole 20b. The ribs 24b include a first spiral rib 241b and a second spiral rib 242b. The first spiral rib 241b extends clockwise from one end of the main body 23b to the middle of the main body 23b. The second spiral rib 242b extends counterclockwise from the other end of the main body 23b to the middle of the main body 23b. A pitch of each of the first spiral rib 241b and the second spiral rib 242b increases from the corresponding end of the main body 23b to the middle of the main body 23b.

Figure 7:
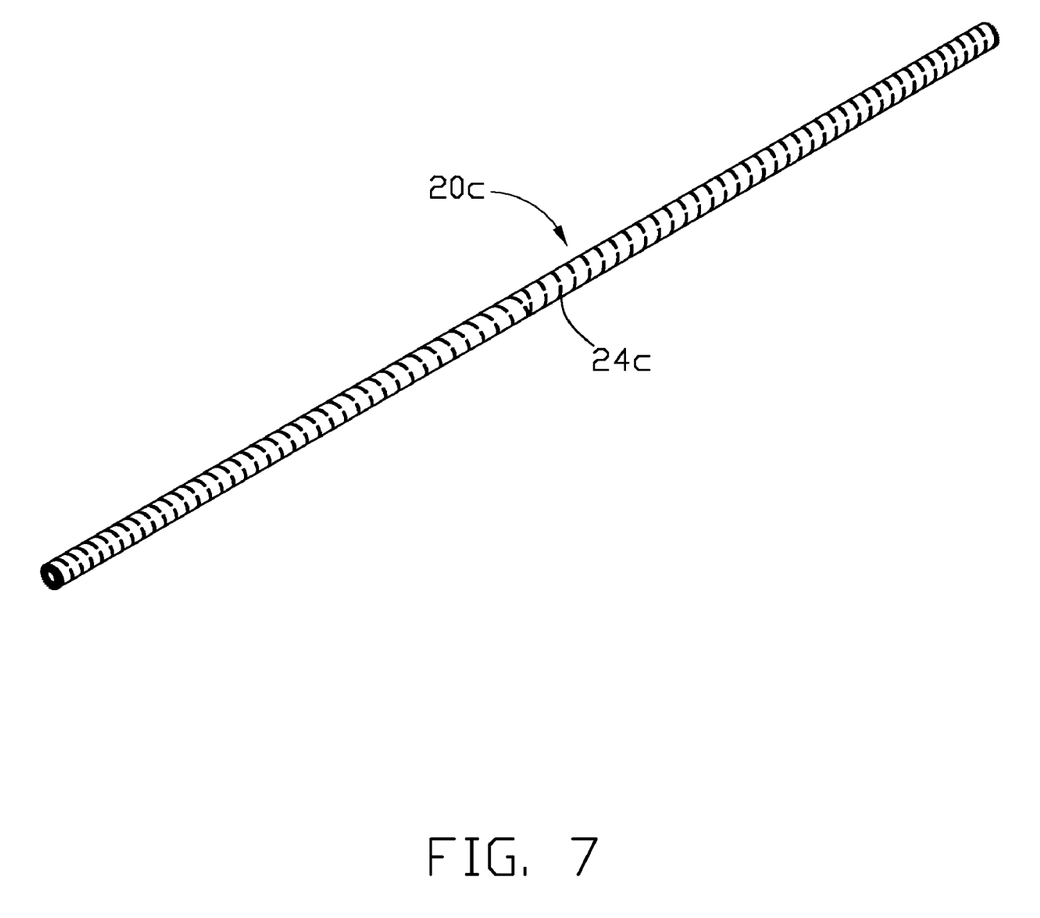
FIG. 7 is an isometric view of a light guide pole according to a fourth embodiment of the present invention.
Figure 8:
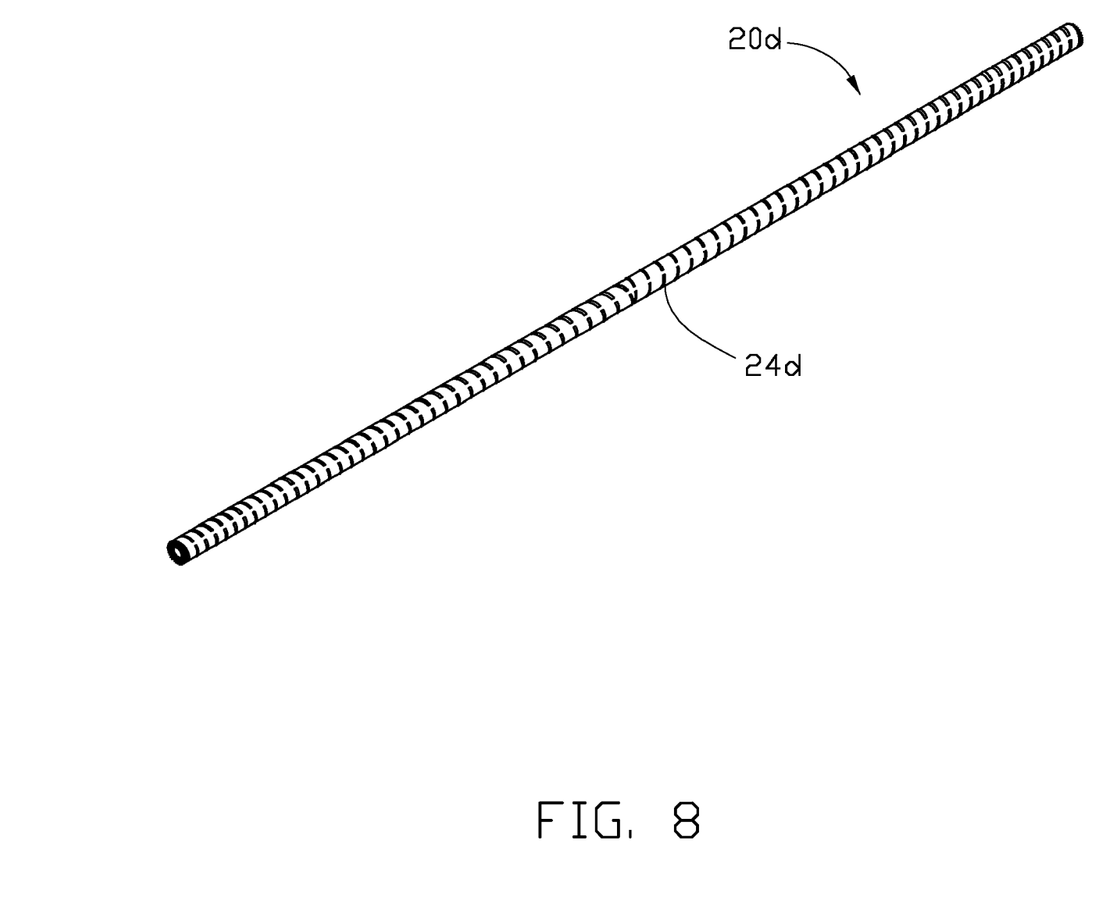
FIG. 8 an isometric view of a light guide pole according to a fifth embodiment of the present invention.

Alternatively, the outer surface of the main body 23, 23a, 23b can include a plurality of micro-indentations or micro-protrusions formed and scattered thereon. The micro-protrusions or micro-indentations can be distributed over the entire outer surface, with distribution density thereof decreasing gradually from two ends of the main body 23, 23a, 23b towards the middle of the main body 23, 23a, 23b. For example, FIG. 7 shows a light guide pole 20c with a plurality of scattered indentations 24c on the outer surface according to a fourth embodiment, and FIG. 8 shows a light guide pole 20d with a plurality of scattered protrusions 24d formed on the outer surface according to a fifth embodiment. Both the scattered indentations 24c and the scattered protrusions 24d are arranged in a spiral fashion as the peculiar tracks of the first spiral groove 241 and the second spiral groove 242.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light emitting diode lamp comprising:
a lampshade;
a light guide pole of light permeable material received in the lampshade, the light guide pole having an elongate profile, with two opposite ends of the light guide pole mounted to two ends of the lampshade, respectively, a plurality of irregular elements formed on an outer surface of the light guide pole, with distribution density of the irregular elements decreasing from the two ends of the light guide pole towards a middle of the light guide pole; and
a plurality of light emitting diodes mounted at the two ends of the light guide pole, wherein light emitted by the light emitting diodes falls incident into the light guide pole and exits the light guide pole from the outer surface thereof.

2. The light emitting diode lamp of claim 1, wherein the irregular elements comprise a first spiral groove extending clockwise from one end of the light guide pole to the middle of the light guide pole and a second spiral groove extending counterclockwise from the other end of the light guide pole to the middle of the light guide pole.

3. The light emitting diode lamp of claim 2, wherein a spiral pitch of each of the first spiral groove and the second spiral groove increases gradually from a corresponding end of the light guide pole to the middle of the light guide pole.

4. The light emitting diode lamp of claim 1, wherein the irregular elements comprise a plurality of micro-indentations distributed and scattered over the outer surface of the light guide pole, arranged in a spiral fashion from a corresponding end of the light guide pole towards the middle of the light guide pole.

5. The light emitting diode lamp of claim 1, wherein the irregular elements comprise a first spiral rib extending clockwise from one end of the light guide pole to the middle of the light guide pole and a second spiral rib extending counterclockwise from the other end of the light guide pole to the middle of the light guide pole.

6. The light emitting diode lamp of claim 5, wherein a spiral pitch of each of the first and the second spiral ribs increases gradually from a corresponding end of the light guide pole to the middle of the light guide pole.

7. The light emitting diode lamp of claim 1, wherein the irregular elements comprise a plurality of micro-protrusions distributed and scattered over the outer surface of the light guide pole, arranged in a spiral fashion from a corresponding end of the light guide pole towards the middle of the light guide pole.

8. The light emitting diode lamp of claim 1, wherein the light guide pole is an elongated column, defining two receiving holes at two end surfaces thereof, with the light emitting diodes received in the receiving holes of the light guide pole, respectively.

9. The light emitting diode lamp of claim 8, wherein each of the end surfaces of the light guide pole forms a plurality of protrusions thereon, wherein each of the protrusions extends radially outwardly from an inner periphery of the end surface to an outer periphery of the end surface.

10. The light emitting diode lamp of claim 1, wherein the lampshade comprises a semi-cylindrical shell, two end caps formed at two ends of the shell and two central holes defined in the two end caps, the shell and the end caps cooperatively forming a space receiving the light guide pole, and the central holes receive the two ends of the light guide pole therein, respectively.

11. A light emitting diode lamp comprising:
a lampshade defining an opening at one side thereof;
a light guide pole of light permeable material received in the lampshade, the light guide pole having an elongate profile, two receiving holes defined on two end surfaces of the light guide pole respectively, a plurality of irregular elements formed on an outer surface of the light guide pole, a distributing compactness of the irregular elements decreased from two ends of the light guide pole to a middle of the light guide pole; and
two light emitting diodes received in the receiving holes of the light guide pole respectively, wherein light emitted by each of the light emitting diodes falls incident into the light guide pole and exits the light guide pole from the outer surface thereof.

12. The light emitting diode lamp of claim 11, wherein the irregular elements are arranged in a spiral fashion from a corresponding end of the light guide pole towards the middle of the light guide pole.

13. The light emitting diode lamp of claim 11, wherein a portion of light from the outer surface of the light guide pole is directly emitted towards the opening of the lampshade, and exits the light emitting diode lamp from the opening.

14. The light emitting diode lamp of claim 1, wherein a portion of light from the outer surface of the light guide pole is first emitted towards an interior surface of the lampshade, then reflected by the lampshade towards the opening of the lampshade, and finally exits the light emitting diode lamp from the opening.

* * * * *